(12) United States Patent
Miyahisa et al.

(10) Patent No.: US 7,951,487 B2
(45) Date of Patent: May 31, 2011

(54) ELECTRODE GROUP FOR NONAQUEOUS BATTERY AND METHOD FOR PRODUCING THE SAME, AND CYLINDRICAL NONAQUEOUS SECONDARY BATTERY AND METHOD FOR PRODUCING THE SAME

(75) Inventors: Masaharu Miyahisa, Osaka (JP); Seiichi Kato, Osaka (JP); Mao Yamashita, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/933,071

(22) PCT Filed: Nov. 16, 2009

(86) PCT No.: PCT/JP2009/006126
§ 371 (c)(1),
(2), (4) Date: Sep. 16, 2010

(87) PCT Pub. No.: WO2010/082260
PCT Pub. Date: Jul. 22, 2010

(65) Prior Publication Data
US 2011/0014510 A1    Jan. 20, 2011

(30) Foreign Application Priority Data

Jan. 16, 2009  (JP) ................................. 2009-007408
Nov. 12, 2009  (JP) ................................. 2009-259090

(51) Int. Cl.
*H01M 4/02*  (2006.01)
*H01M 4/04*  (2006.01)
*H01M 10/12*  (2006.01)
*H01M 10/0587*  (2010.01)

(52) U.S. Cl. .......... 429/209; 429/94; 429/129; 429/246; 429/247; 429/251; 29/623.5

(58) Field of Classification Search .................... 429/94, 429/209; 29/623.5
See application file for complete search history.

(56) References Cited

U.S. PATENT DOCUMENTS

| | | |
|---|---|---|
| 2005/0053833 A1 | 3/2005 | Hayashida et al. |
| 2006/0051669 A1 | 3/2006 | Hayashida et al. |
| 2006/0194116 A1 | 8/2006 | Suzuki et al. |
| 2006/0281007 A1 | 12/2006 | Tsutsumi et al. |
| 2009/0181310 A1 | 7/2009 | Hayashida et al. |
| 2009/0325045 A1 | 12/2009 | Miyahisa et al. |
| 2010/0035140 A1 | 2/2010 | Miyahisa et al. |

FOREIGN PATENT DOCUMENTS

| | | |
|---|---|---|
| JP | 07-220759 | 8/1995 |
| JP | 09-298057 | 11/1997 |
| JP | 11-154508 | 6/1999 |
| JP | 2001-023612 | 1/2001 |
| JP | 2001-176558 | 6/2001 |
| JP | 2001222993 | * 8/2001 |
| JP | 2001-357836 | 12/2001 |
| JP | 2002-042789 | 2/2002 |
| JP | 2004-006275 | 1/2004 |
| JP | 2005-285607 | 10/2005 |
| JP | 2006-012788 | 1/2006 |
| JP | 2006-107853 | 4/2006 |
| JP | 2008-234855 | 10/2008 |
| JP | 2009-043718 | 2/2009 |
| JP | 2009-049006 | 3/2009 |
| WO | WO 2005/029614 A1 | 3/2005 |
| WO | WO 2005/117167 A1 | 12/2005 |
| WO | WO 2009/011123 A1 | 1/2009 |
| WO | WO 2009/013889 A1 | 1/2009 |
| WO | WO 2009/013890 A1 | 1/2009 |

* cited by examiner

*Primary Examiner* — Patrick Ryan
*Assistant Examiner* — Ladan Mohaddes
(74) *Attorney, Agent, or Firm* — McDermott Will & Emery LLP

(57) ABSTRACT

A positive electrode 2 includes a positive electrode current collector lead 70 connected to a core exposed part 78 formed at a longitudinal center of a current collector core 72. A negative electrode 3 includes a double-coated part 14 including an active material layer 13 and a porous protective film 28 formed on each surface of a current collector core 12, a core exposed part 18, and a single-coated part 17 which is located between the double-coated part 14 and the core exposed part 18, and includes the active material layer 13 and the porous protective film 28 formed only on one of the surfaces of the current collector core 12. A plurality of grooves 10 are formed in each surface of the double-coated part 14, while the grooves 10 are not formed in the single-coated part 17. A negative electrode current collector lead 20 is connected to the core exposed part 18. The negative electrode 3 is wound in such a manner that the core exposed part 18 constitutes a last wound end.

12 Claims, 8 Drawing Sheets

ELECTRODE GROUP FOR NONAQUEOUS BATTERY AND METHOD FOR PRODUCING THE SAME, AND CYLINDRICAL NONAQUEOUS SECONDARY BATTERY AND METHOD FOR PRODUCING THE SAME

RELATED APPLICATIONS

This application is the U.S. National Phase under 35 U.S.C. §371 of International Application No. PCT/JP2009/006126, filed on Nov. 16, 2009, which in turn claims the benefit of Japanese Application Nos. 2009-007408, filed on Jan. 16, 2009 and 2009-259090, filed on Nov. 12, 2009, the disclosures of which applications are incorporated by reference herein.

TECHNICAL FIELD

The present invention particularly relates to an electrode group for a nonaqueous battery and a method for producing the same, and a cylindrical nonaqueous secondary battery and a method for producing the same.

BACKGROUND ART

In recent years, lithium secondary batteries have widely been used as driving power supplies for mobile electronic devices and communication devices. In such a lithium secondary battery, in general, a carbon material capable of inserting and extracting lithium is used as a negative electrode, and a composite oxide of transition metal and lithium such as $LiCoO_2$ etc., is used as a positive electrode to provide the secondary battery with high potential and high discharge capacity. With increase of functions of the electronic devices and communication devices, batteries with higher capacity have been in demand.

To realize a high capacity lithium secondary battery, for example, the battery capacity can be increased by increasing a volume of the positive and negative electrodes contained in a battery case, and reducing empty space except for space occupied by the electrodes in the battery case. Further, the battery capacity can be increased by applying a mixture paste made of a material of the positive or negative electrode to a current collector core, drying the paste to form an active material layer, and pressing the active material layer at high pressure to be compressed to a predetermined thickness, thereby increasing a filling density of the active material.

When the filling density of the active material in the electrode increases, it would be difficult to penetrate a nonaqueous electrolyte, which is injected in a battery case and has a relatively high viscosity, into small gaps in an electrode group formed by winding or stacking the positive and negative electrodes at high density with a separator interposed therebetween. Accordingly, it requires a long time to impregnate the electrode group with a predetermined amount of the nonaqueous electrolyte. Further, with an increased filling density of the active material of the electrode, porosity of the electrode is reduced, thereby making penetration of the electrolyte into the electrode group difficult. Therefore, impregnation of the electrode group with the nonaqueous electrolyte is greatly impaired, thereby varying the distribution of the nonaqueous electrolyte in the electrode group.

To overcome this disadvantage, grooves for guiding the nonaqueous electrolyte are formed in a surface of a negative electrode active material layer along a penetrating direction of the nonaqueous electrolyte to allow the nonaqueous electrolyte to penetrate into the whole part of the negative electrode. When the width or depth of the grooves is increased, the impregnation can be done in a short time. However, this reduces the amount of the active material, and therefore, charge/discharge capacity may decrease, or a reaction between the electrodes may become nonuniform, thereby deteriorating battery characteristics. Taking these into consideration, a method for setting the width and depth of the grooves to predetermined values has been proposed (see, e.g., Patent Document 1).

However, the grooves formed in the surface of the negative electrode active material layer may cause break of the electrode when the electrode is wound to form the electrode group. Therefore, a method for preventing the break of the electrode while improving the impregnation has been proposed. In this method, the grooves are formed in the surface of the electrode to form an inclination angle with a longitudinal direction of the electrode in order to distribute tensile force applied in the longitudinal direction of the electrode when the electrode is wound to form an electrode group. This can prevent the break of the electrode (see, e.g., Patent Document 2).

Another method has also been proposed, although it is not intended to improve the impregnation with the electrolyte. In this method, a porous film having convex portions partially formed on a surface facing the positive or negative electrode is provided for the purpose of alleviating overheat caused by overcharge. Accordingly, a larger amount of the nonaqueous electrolyte is held in gaps between the convex portions of the porous film and the electrode than in the other parts, thereby inducing an overcharge reaction in the gaps in a concentrated manner. This can alleviate the overcharge of a battery, and can alleviate the overheat due to the overcharge (see, e.g., Patent Document 3).

In a lithium secondary battery which has achieved high capacity in the above-described manner, for example, the separator may be damaged by a foreign matter that enters the battery for some reason, and an internal short circuit between the positive and negative electrodes may occur. In this case, a current intensively flows through the short circuited portion, thereby causing abrupt heat generation. This may cause decomposition of the positive and negative electrode materials, or boiling or decomposition of the electrolyte, thereby generating gas etc. A solution to these disadvantages derived from the internal short circuit has been proposed, in which a porous protective film is formed to cover the surface of the negative or positive electrode active material layer to reduce the internal short circuit (see, e.g., Patent Documents 4 and 5).

Patent Document 1: Japanese Patent Publication No. H09-298057
Patent Document 2: Japanese Patent Publication No. H11-154508
Patent Document 3: Japanese Patent Publication No. 2006-12788
Patent Document 4: Japanese Patent Publication No. H07-220759
Patent Document 5: Pamphlet of International Patent Publication No. 2005/029614

SUMMARY OF THE INVENTION

Technical Problem

According to the conventional method of Patent Document 2, the electrolyte can penetrate into the electrodes in a shorter time as compared with the case where the electrodes are not provided with grooves. However, the time required for the penetration cannot be greatly reduced because the grooves are formed in only one of the surfaces of the electrode. Thus, the penetration takes quite a long time, an amount of the electrolyte evaporated cannot easily be reduced as much as possible, and the loss of the electrolyte cannot easily be reduced. Further, the grooves formed in only one of the surfaces of the electrode cause stress on the electrode. Therefore, the electrode tends to be curled on the side where the grooves are not formed.

According to the conventional method of Patent Document 3, the electrode group formed by winding the positive and negative electrodes with the separator interposed therebetween includes a useless, non-reactive portion which does not contribute to a battery reaction. Thus, space inside the battery case cannot effectively be used, thereby making the increase of the battery capacity difficult.

According to a method for forming the grooves in the surfaces of the active material layers formed on each surface of an electrode, a pair of rollers having a plurality of protrusions on their surfaces are arranged above and below the electrode, and the rollers are rotated and moved on the surfaces of the electrode while applying pressure thereto. In this method (hereafter referred to as "roll pressing"), a plurality of grooves can simultaneously be formed in each of the surfaces of the electrode. Therefore, this method is suitable for mass-production.

In view of the conventional technologies described in Patent Documents 4 and 5, the inventors of the present application have found the following problems as a result of examination of various types of electrodes including the grooves formed in the surfaces of the active material layers by roll pressing for the purpose of improving impregnation with the electrolyte.

FIGS. 8(a) to 8(d) are perspective views illustrating steps for producing an electrode 103. First, as shown in FIG. 8(a), an electrode hoop material 111 is formed which includes electrode component parts 119, each of which includes a double-coated part 114 including an active material layer 113 formed on each surface of a belt-like current collector core 112, a single-coated part 117 including the negative electrode active material layer 113 formed on only one of the surfaces of the current collector core 112, and a core exposed part 118 which does not include the active material layer 113. Then, as shown in FIG. 8(b), a porous protective film 128 is formed to cover the surface of the active material layer 113.

Then, as shown in FIG. 8(c), a plurality of grooves 110 are formed in the surface of the porous protective film 128 to extend in the surface of the active material layer 113 by roll pressing. Then, as shown in FIG. 8(d), the electrode hoop material 111 is cut at boundaries of the double-coated parts 114 and the core exposed parts 118. Thereafter, a current collector lead 120 is connected to each of the core exposed parts 118. Thus, the negative electrodes 103 are produced. However, as shown in FIG. 9, when the electrode hoop material 111 is cut at the boundary of the double-coated part 114 and the core exposed part 118, the core exposed part 118 and the single-coated part 117 continuous with the core exposed part are greatly deformed into a curved shape.

A possible cause of this phenomenon is as follows. The roll pressing is performed by continuously passing the electrode hoop material 111 through a gap between the rollers. Therefore, the grooves 110 are formed in the surface of the porous protective film 128 to extend in the surface of the active material layer 113 on each of the surfaces of the double-coated part 114, and are formed also in the surface of the porous protective film 128 to extend in the active material layer 113 of the single-coated part 117. Specifically, when forming the grooves 110, the negative electrode active material layer 113 stretches. In the double-coated part 114, the active material layers 113 formed on the surfaces of the electrode stretch to the same extent. In the single-coated part 17, in contrast, the active material layer 113 stretches only on one of the surfaces thereof. Thus, due to tensile stress of the active material layer 113, the single-coated part 117 is greatly deformed to curve on the side on which the active material layer 113 is not formed.

If an end part of the electrode 103 (including the core exposed part 118 and the single-coated part 117 continuous with the core exposed part 118) is curved by cutting the electrode hoop material 111, the electrodes 103 may be misaligned when they are wound to form an electrode group. Further, in the case where the electrode group is formed by stacking the electrodes, the electrodes may possibly be bent. Furthermore, the end part of the electrode 103 may not reliably be chucked in transferring the electrode 103, resulting in failure in transfer of the electrode 103, or falling of the active material. This may reduce not only productivity, but also reliability of the batteries.

In view of the above-described problems, the present invention has been achieved. An object of the invention is to provide an electrode group for a nonaqueous battery which allows good impregnation with an electrolyte, and has high productivity and reliability and a method for producing the same, and a cylindrical nonaqueous secondary battery and a method for producing the same.

Solution to the Problem

An electrode group for a nonaqueous battery of the present invention includes: a positive electrode and a negative electrode wound with a separator interposed therebetween. In this electrode group, the positive electrode includes a double-coated part which includes a positive electrode active material layer formed on each surface of a positive electrode current collector core; and a core exposed part which is located at a longitudinal center of the positive electrode current collector core, and does not include the positive electrode active material layer. A positive electrode current collector lead is connected to the core exposed part of the positive electrode. The negative electrode includes a double-coated part which includes a negative electrode active material layer and a porous protective film formed on each surface of a negative electrode current collector core, a core exposed part which is located at an end of the negative electrode current collector core, and does not include the negative electrode active material layer and a porous protective film, and a single-coated part which is located between the double-coated part and the core exposed part, and includes the negative electrode active material layer and a porous protective film formed only on one of the surfaces of the negative electrode current collector core. A plurality of grooves are formed in each surface of the double-coated part of the negative electrode, while the grooves are not formed in the single-coated part of the negative electrode. The grooves are formed in a surface of the porous protective film to extend in a surface of the active material layer, and a thickness of the porous protective film is smaller than a depth of the grooves. A negative electrode current collector lead is connected to the core exposed part of the negative electrode, and the negative electrode is wound in such a manner that the core exposed part of the negative electrode constitutes a last wound end.

The above-described configuration can improve impregnation with an electrolyte, thereby reducing time required for the impregnation. Further, a useless portion which does not contribute to a battery reaction can be eliminated, and tensile force applied by the negative electrode active material layer formed in the single-coated part can be alleviated. This can prevent the core exposed part and the single-coated part continuous with the core exposed part from greatly deforming into a curved shape. The electrode group can be provided with an almost perfect circular cross-section. This makes a distance between the negative and positive electrodes of the electrode group uniform, thereby improving cycle characteristics. The positive electrode current collector lead is located at the longitudinal center of the positive electrode. This can improve collection of electricity generated by a battery reaction at each end of the positive electrode. In addition, the porous protective film can improve an insulation property of the negative electrode, thereby reducing an internal short circuit.

In the electrode group for the nonaqueous battery of the present invention, the porous protective film is preferably made of a material containing inorganic oxide as a main ingredient. This can further improve the insulation property of the negative electrode. The inorganic oxide which is the main ingredient of the porous protective film may preferably contain alumina and/or silica as a main ingredient. Thus, the negative electrode can be provided with high resistance to heat, high insolubility to the electrolyte, high reliability, and high insulation property.

In the electrode group for the nonaqueous battery of the present invention, a phase of the grooves formed in one of the surfaces of the double-coated part of the negative electrode is preferably symmetric with a phase of the grooves formed in the other surface of the double-coated part of the negative electrode. This can reduce damage to the negative electrode caused by forming the grooves in the negative electrode as much as possible, and can prevent break of the negative electrode when the negative electrode is wound to form an electrode group.

In the electrode group for the nonaqueous battery of the present invention, a depth of the grooves formed in each of the surfaces of the double-coated part of the negative electrode is preferably in the range of 4 µm to 20 µm. This can improve penetration of the electrolyte, and can prevent the active material from falling.

In the electrode group for the nonaqueous battery of the present invention, the grooves formed in each of the surfaces of the double-coated part of the negative electrode are preferably arranged at a pitch of 100 µm to 200 µm in the longitudinal direction of the negative electrode. This can reduce damage to the negative electrode caused by forming the grooves in the negative electrode as much as possible. The grooves formed in each of the surfaces of the double-coated part of the negative electrode preferably extend from one lateral end to the other lateral end of the negative electrode. This allows easy impregnation of the electrode group with the electrolyte from an end face of the electrode group, thereby reducing time required for the impregnation. Further, the grooves formed in one of the surfaces of the double-coated part of the negative electrode, and the grooves formed in the other surface of the double-coated part of the negative electrode are preferably inclined at an angle of 45 relative to the longitudinal direction of the negative electrode in different directions, so as to extend in directions crossing each other at right angles. This can avoid the formation of the grooves running in the direction which allows easy break of the negative electrode, thereby preventing concentration of stress. Thus, the break of the negative electrode can be prevented.

In the electrode group for the nonaqueous battery of the present invention, the negative electrode current collector lead, and the negative electrode active material layer and the porous protective film of the single-coated part of the negative electrode are preferably arranged on the opposite surfaces of the current collector core. This allows provision of the electrode group with an almost perfect circular cross-section. Therefore, a distance between the negative and positive electrodes of the electrode group becomes uniform, thereby improving cycle characteristics.

A method for producing the electrode group for the nonaqueous battery of the present invention includes: winding the positive electrode and the negative electrode with the separator interposed therebetween, wherein the positive electrode and the negative electrode are wound in such a manner that the core exposed part of the negative electrode constitutes a last wound end.

In a cylindrical nonaqueous secondary battery of the present invention, the electrode group of the present invention is contained in a battery case, a predetermined amount of a nonaqueous electrolyte is injected in the battery case, and an opening of the battery case is hermetically sealed.

A method for producing the cylindrical nonaqueous secondary battery of the present invention includes: forming the electrode group for the nonaqueous battery of the present invention; and introducing the electrode group and the nonaqueous electrolyte in the battery case, and sealing the battery case.

Advantages of the Invention

According to the present invention, a plurality of grooves are formed in the surface of the porous protective film to extend in the surface of the active material layer on each of the surfaces of the double-coated part, while the grooves are not formed in the single-coated part. This can improve the impregnation with the electrolyte, and can prevent the core exposed part and the single-coated part continuous with the core exposed part of the negative electrode from significantly deforming in the curved shape.

Since the winding is performed in such a manner that the core exposed part of the negative electrode current collector core to which the negative electrode current collector lead is connected constitutes a last wound end, a useless portion of the negative electrode active material layer which is located at an outer circumference of the electrode group, and does not contribute to a battery reaction can be eliminated, and space inside the battery case can effectively be used, thereby increasing battery capacity. Further, the negative electrode current collector lead would not form a protrusion at the innermost turn of the electrode group, thereby providing the electrode group with an almost perfect circular cross-section. Thus, a distance between the positive and negative electrodes of the electrode group becomes uniform, thereby improving cycle characteristics.

Further, the positive electrode current collector lead is located at the longitudinal center of the positive electrode. This can improve collection of electricity generated by a battery reaction at each end of the positive electrode.

In addition, the porous protective film is formed to cover the active material layer formed on the surface of the current collector core. This can improve an insulation property of the negative electrode, thereby reducing an internal short circuit.

As described above, an electrode group for a nonaqueous battery which allows good impregnation with an electrolyte, and has high productivity and reliability, and a cylindrical nonaqueous secondary battery can be provided.

DESCRIPTION OF EMBODIMENTS

Figure 1:
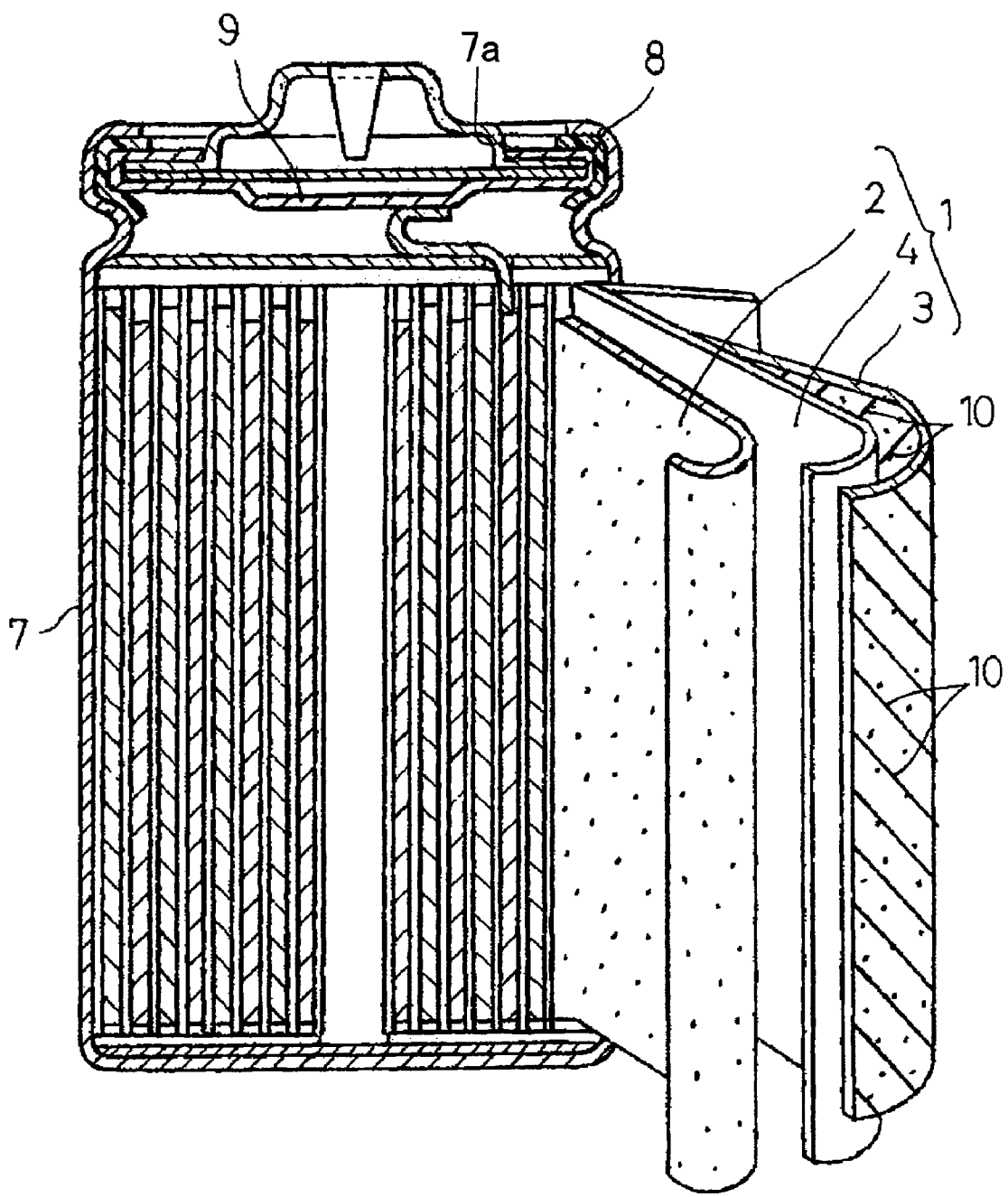
FIG. 1 is a vertical cross-sectional view illustrating the structure of a cylindrical nonaqueous secondary battery according to an embodiment of the present invention.

An embodiment of the present invention will be described below in detail with reference to the drawings. In the drawings, components having substantially the same function are indicated by the same reference characters for the sake of easy description. The present invention is not limited to the following embodiment.

FIG. 1 is a vertical cross-sectional view schematically illustrating the cylindrical nonaqueous secondary battery of the present embodiment. The cylindrical nonaqueous secondary battery includes an electrode group 1 formed by winding a positive electrode 2 containing lithium composite oxide as an active material, and a negative electrode 3 containing a material capable of holding lithium as an active material into spiral form, with a separator 4, which is a porous insulator, interposed therebetween.

The electrode group 1 is placed in a cylindrical battery case 7 having a closed end, and an electrolyte (not shown) constituted of a predetermined amount of a nonaqueous solvent is injected in the battery case 7 to impregnate the electrode group 1 with the electrolyte. An opening 7a of the battery case 7 is bent radially inward, and is crimped onto a sealing plate 9 which is inserted in the opening, and has a gasket 8 attached to a circumference thereof, thereby hermetically sealing the battery case. In the cylindrical nonaqueous secondary battery, a plurality of grooves 10 are formed in each surface of the negative electrode 3 in such a manner that the grooves 10 formed in one of the surfaces, and the grooves 10 formed in the other surface extend in the directions crossing each other.

The electrolyte is allowed to penetrate through the grooves 10, thereby improving impregnation of the electrode group 1 with the electrolyte. In addition, a porous protective film 28 is formed to cover a surface of an active material layer to reduce an internal short circuit.

Figure 2:
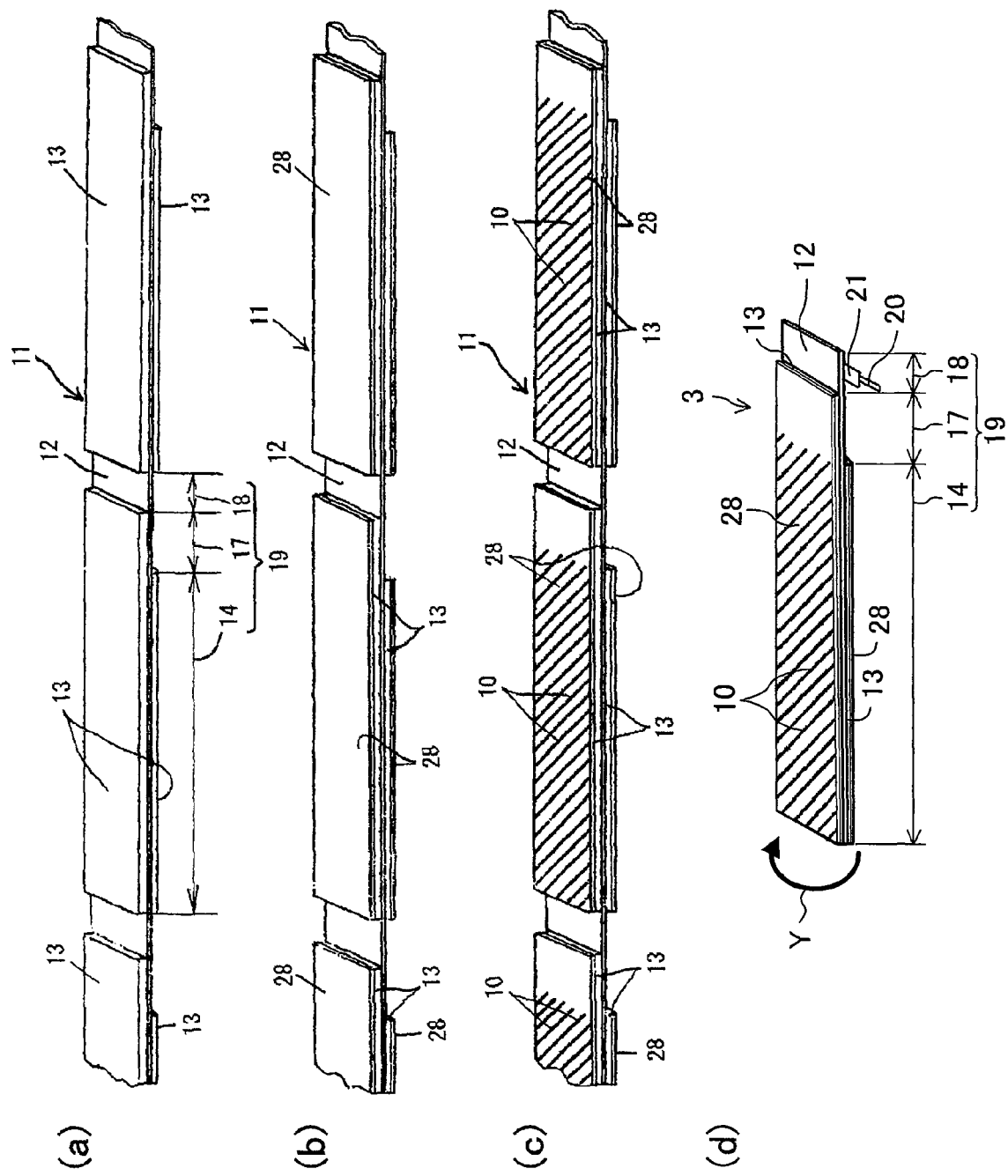
FIG. 2(a) is a perspective view illustrating a negative electrode active material applied to a current collector core in the step of producing a negative electrode for a battery according to the embodiment of the invention.
FIG. 2(b) is a perspective view illustrating a porous protective film formed on a surface of a negative electrode active material layer in the step.
FIG. 2(c) is a perspective view illustrating a double-coated part including grooves formed in the step.
FIG. 2(d) is a perspective view illustrating a negative electrode separated from a negative electrode hoop in the step.

FIGS. 2(a) to 2(d) are perspective views illustrating the steps of producing the negative electrode 3. FIG. 2(a) illustrates a negative electrode hoop material 11 before being divided into the negative electrodes 3. The negative electrode hoop material 11 is formed by applying a negative electrode mixture paste to each surface of a current collector core 12 made of 10 µm thick, long strip-shaped copper foil, drying the paste, pressing the resulting current collector core 12 to be compressed to a total thickness of 200 µm to form negative electrode active material layers 13, and cutting the obtained product into strips of about 60 mm in width. The negative electrode mixture paste may be paste obtained by mixing, for example, artificial graphite as an active material, styrene-butadiene copolymer rubber particle dispersion as a binder, and carboxymethyl cellulose as a thickener, with a proper amount of water.

In the negative electrode hoop material 11, a double-coated part 14 which includes the negative electrode active material layer 13 formed on each surface of the current collector core 12, a single-coated part 17 which includes the negative electrode active material layer 13 formed only on one of the surfaces of the current collector core 12, and a core exposed part 18 which does not include the negative electrode active material layer 13 on the current collector core 12 are provided, thereby constituting an electrode component part 19. The negative electrode hoop material 11 includes a multiple ones of the electrode component part 19 continuously formed in a longitudinal direction thereof. The electrode component part 19 in which the negative electrode active material layer 13 is partially provided can easily be formed by applying the negative electrode active material layer 13 by a known intermittent application process.

FIG. 2(b) illustrates the porous protective film 28 formed by applying a coating prepared by mixing a small amount of a water soluble polymeric binder in an inorganic additive to the surface of the negative electrode active material layer 13, and drying the coating. The porous protective film 28 is not formed on the core exposed part 18 which does not contribute to a battery reaction. Due to the absence of the porous protective film 28 on the core exposed part 18, battery capacity increases. Further, in a step described later (see FIG. 2(d)) for welding a current collector lead 20 to the core exposed part 18, there is no need to peel the porous protective film 28 from a portion of the core exposed part 18 to which the current collector lead 20 is welded. This can improve productivity.

The porous protective film 28 has a protective function of reducing an internal short circuit in a battery configured as shown in FIG. 1, and has porosity. Therefore, the porous protective film 28 does not interfere with an inherent function of the battery, i.e., an electrode reaction with electrolyte ions in the electrolyte. The inorganic additive may preferably silica and/or alumina. Silica and alumina have high resistance to heat, high electrochemical stability in the range of usage of the nonaqueous secondary batteries, and high insolubility to the electrolyte, and are suitable for preparing the coating. Use of these materials can provide the porous protective film 28 with high reliability, and an electrical insulation property. The binder may preferably be polyvinylidene fluoride.

FIG. 2(c) illustrates the negative electrode hoop material 11 in which the grooves 10 are formed only in the porous protective film 28 and the negative electrode active material layer 13 formed on each surface of the double-coated part 14, while the grooves 10 are not formed in the porous protective film 28 and the negative electrode active material layer 13 of the single-coated part 17.

The thickness of the porous protective film 28 is not particularly limited, but the thickness is preferably smaller than the depth of the grooves 10 described later. For example, when the depth of the grooves 10 (the depth of the grooves formed in both of the porous protective film 28 and the negative electrode active material layer 13) is 4 to 10 µm, the thickness of the porous protective film 28 is preferably 2 to 4 µm. When the thickness of the porous protective film is smaller than 2 µm, the protective function of reducing the internal short circuit would disadvantageously be insufficient.

In the negative electrode hoop material 11 provided with the grooves 10, a current collector lead 20 is welded to the current collector core 12 of the core exposed part 18, and the current collector lead 20 is coated with an insulation tape 21. Then, the negative electrode hoop material 11 is cut by a cutter at the core exposed parts 18 adjacent to the double-coated parts 14 to be divided into the electrode component parts 19 as shown in FIG. 2(d). Thus, a negative electrode 3 for a cylindrical nonaqueous secondary battery is produced.

The negative electrode 3 produced in this manner includes, as shown in FIG. 2(d), the double-coated part 14 including the negative electrode active material layer 13 and the porous protective film 28 formed on each surface of the current collector core 12, the single-coated part 17 including the negative electrode active material layer 13 and the porous protective film 28 formed on only one of the surfaces of the current collector core 12, and the core exposed part 18. In each of the surfaces of the double-coated part 14, a plurality of grooves 10 are formed in the surface of the porous protective film 28 to extend in the surface of the negative electrode active material layer 13 (the grooves 10 are formed also in the surface of the negative electrode active material layer 13), while the grooves 10 are not formed in the single-coated part 17. The core exposed part 18 is located at an end of the negative electrode 3 (specifically, at a longitudinal end of the negative electrode 3), and the negative electrode current collector lead 20 is connected to the core exposed part 18.

Figure 3:
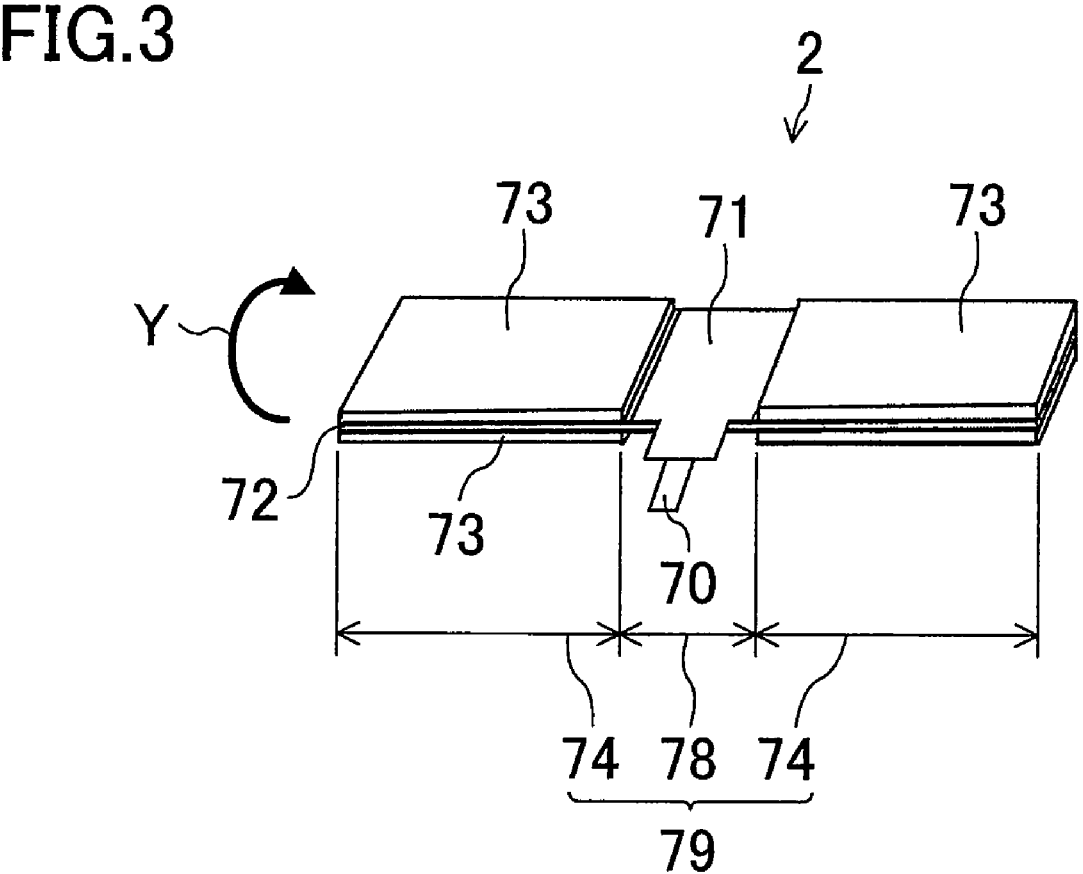
FIG. 3 is a perspective view illustrating a positive electrode for a battery according to the embodiment of the present invention.
Figure 4:
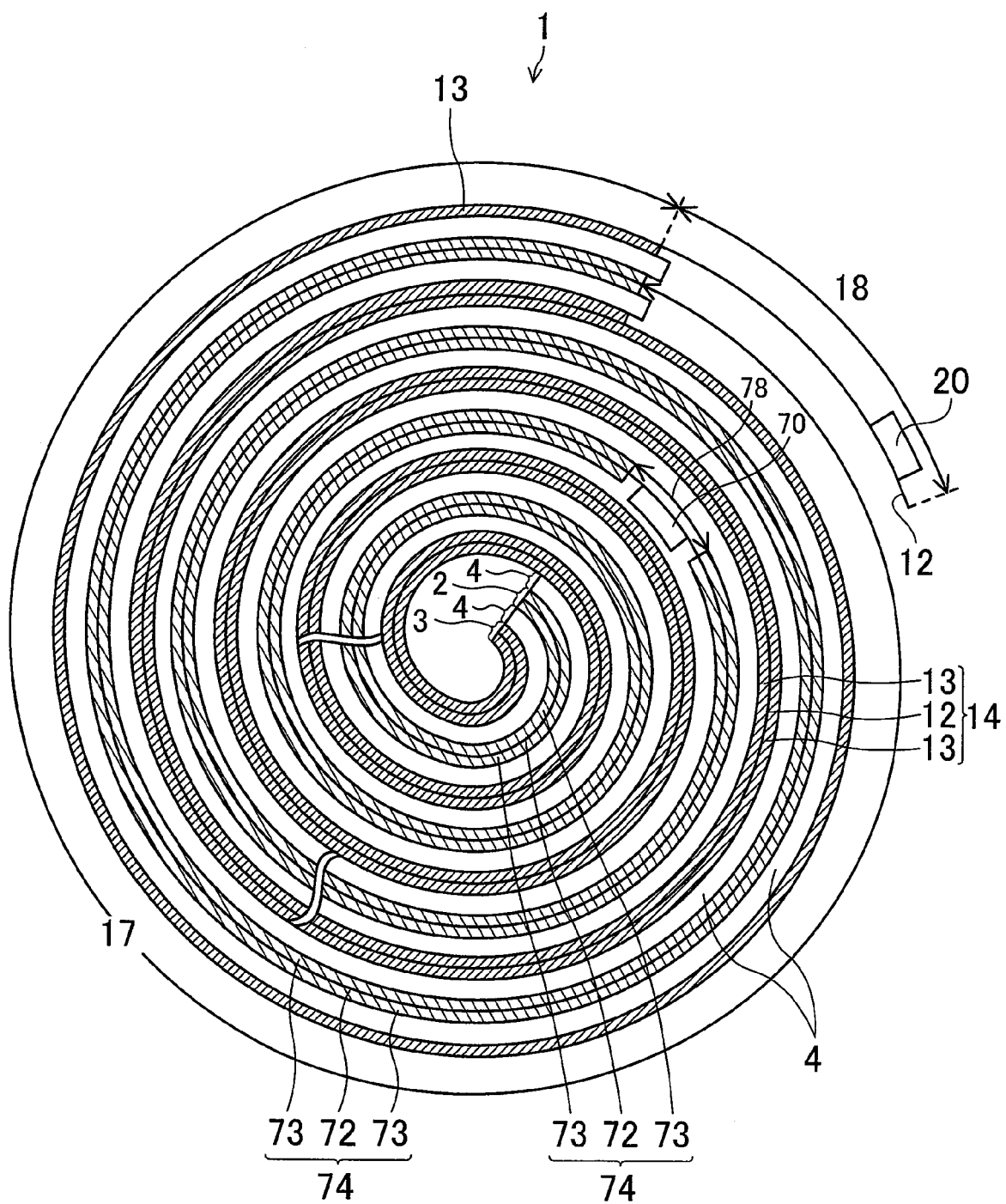
FIG. 4 is a transverse cross-sectional view illustrating part of an electrode group for a battery according to the embodiment of the present invention.

FIG. 3 is a perspective view illustrating the positive electrode 2. FIG. 4 is a transverse cross-sectional view illustrating part of the electrode group 1. In FIG. 4, the porous protective film 28 formed on the surface of the negative electrode active material layer 14 is not shown.

The positive electrode 2 is formed by the following manner. A positive electrode hoop material (not shown) is formed in the same process for forming the negative electrode hoop material. Then, a current collector lead 70 is welded to a current collector core 72 of a core exposed part 78, and the current collector lead 70 is covered with an insulation tape 71. Then, the positive electrode hoop material is cut by a cutter to provide a double-coated part 74 of a predetermined length, thereby dividing the positive electrode hoop material into electrode component parts 79.

The positive electrode 2 produced in this manner includes a double-coated part 74, and a core exposed part 78 as shown in FIG. 3. The core exposed part 78 is located at a longitudinal center of the positive electrode 2, and the positive electrode current collector lead 70 is connected to the core exposed part 78.

The positive electrode 2 and the negative electrode 3 are wound into spiral form in the direction of an arrow Y (see FIGS. 2(c) and 3) with the separator 4 interposed therebetween, thereby constituting the electrode group 1 of the present embodiment.

After the negative electrode active material layer 13 is formed on the double-coated part 14 of the current collector core 12, the grooves 10 may be formed in the surface of the negative electrode active material layer 13, and then the porous protective film 28 may be formed on the surface of the negative electrode active material layer 13 in which the grooves 10 are formed. In this case, however, the grooves 10 formed in the surface of the negative electrode active material layer 13 are filled with the porous protective film 28, and the substantial depth of the grooves 10 is reduced. This cannot sufficiently improve the impregnation with the electrolyte.

The negative electrode 3 configured in the above-described manner offers the following advantages.

Specifically, when the negative electrode 3 and the positive electrode 2 are wound into spiral form with the separator 4 interposed therebetween to constitute the electrode group 1, the electrodes are wound in such a manner that the core exposed part 18 to which the negative electrode current collector lead 20 is attached constitutes a last wound end, and a surface of the single-coated part 17 of the negative electrode 3 on which the negative electrode active material layer 13 is not formed constitutes an outer circumferential surface of the electrode group 1 as shown in FIG. 4. The outer circumferential surface of the electrode group 1 does not contribute to the battery reaction when the battery is working. Therefore, space inside the battery case 7 can efficiently be used by not providing the positive electrode active material layer 13 on the portion which does not contribute to the battery reaction, thereby improving battery capacity.

Further, the grooves 10 are not formed in the negative electrode active material layer 13 and the porous protective film 28 of the single-coated part 17. Therefore, when cutting the negative electrode hoop material 11 into the electrodes as shown in FIG. 2(d), the core exposed part 18 and the single-coated part 17 continuous with the core exposed part 18 of the negative electrode 3 can be prevented from being greatly deformed into a curved shape. This can prevent misalignment when the positive electrode 2 and the negative electrode 3 are wound to form the electrode group 1. Further, when winding the negative electrode 3 by a winding device, troubles in transferring the electrode, such as failure in chucking, and falling of the negative electrode active material, can be prevented because the electrode is prevented from being greatly deformed into a curved shape. This makes it possible to provide a negative electrode for a battery which shows good impregnation with an electrolyte, and has high productivity and reliability.

Further, the negative electrode current collector lead 20 is connected to the surface of the core exposed part 18 of the negative electrode 3 opposite the surface of the single-coated part 17 on which the negative electrode active material layer 13 is formed, and constitutes a last wound end Thus, the negative electrode current collector lead 20 would not form a protrusion at the innermost turn of the electrode group, thereby providing the electrode group with an almost perfect circular cross-section. This allows easy placement of the electrode group 1 in the battery case 7, and a distance between the negative electrode 3 and the positive electrode 2 becomes uniform, thereby improving cycle characteristics. Similar advantages can be obtained by an electrode group 1 including the electrode which are accordion-folded in such a manner that the core exposed part of the negative electrode constitutes a last folded end. When the electrode is accordion-folded with the core exposed part to which the negative electrode current collector lead 20 attached constitutes the last folded end, troubles in transferring the electrode, such as failure in chucking, and falling of the negative electrode active material, can be prevented. Further, the negative electrode current collector lead 20 would not form a protrusion at the innermost turn of the electrode group, thereby preventing deformation of the wound electrodes. This allows easy placement of the electrode group 1 in the battery case 7, and a distance between the negative electrode 3 and the positive electrode 2 becomes uniform, thereby improving cycle characteristics. Thus, an electrode group for a battery which allows good impregnation with the electrolyte, and has high productivity and reliability can be produced.

Moreover, with the negative electrode current collector lead 20 located on the outermost circumferential surface of the electrode group 1, the negative electrode current collector lead 20 can be prevented from peeling from the negative electrode 3 even if an end of the negative electrode current collector lead 20 is bent to be welded to a bottom surface of the battery case 7. Thus, the negative electrode current collector lead 20 can be welded to the bottom surface of the battery case 7 without causing great stress to the welded joint between the negative electrode current collector lead 20 and the current collector core 12.

The positive electrode 2 configured in the above-described manner offers the following advantages.

Specifically, the core exposed part 78 of the positive electrode 2 is located at the longitudinal center of the positive electrode 2. Thus, as compared with a positive electrode in which the core exposed part is located at a longitudinal end of the positive electrode, a distance from the positive electrode current collector lead 70 to each longitudinal end of the positive electrode 2 can be reduced. This allows effective current collection. For example, this can improve collection of electricity generated by a battery reaction at each end of the positive electrode. As a result, current collection can be improved.

Figure 5:
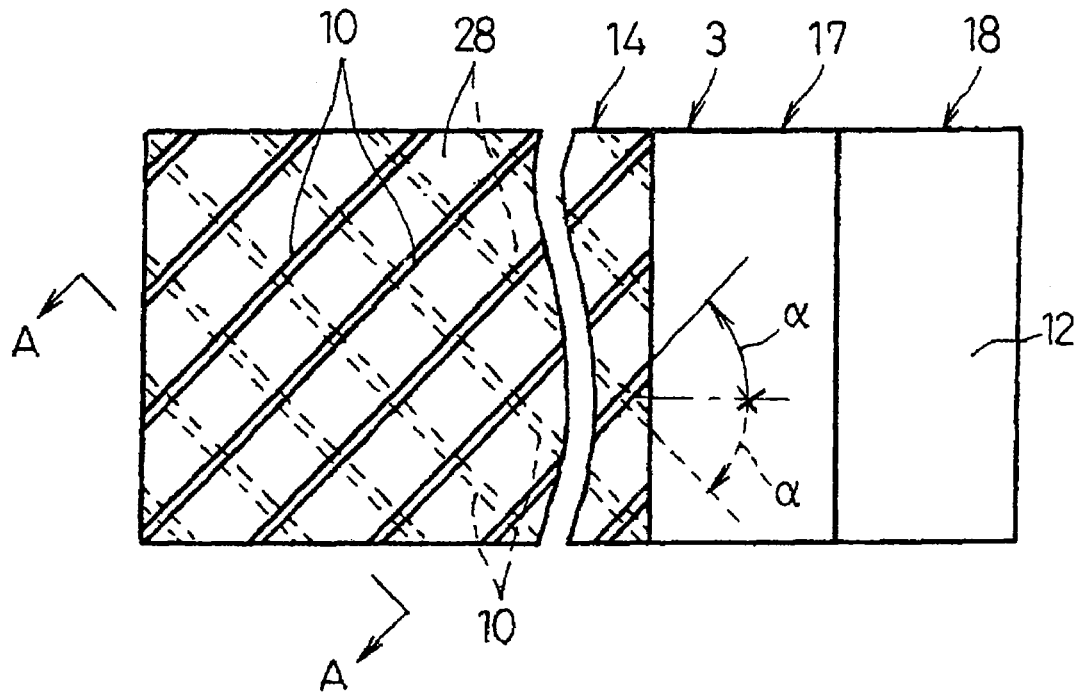
FIG. 5 is a partially enlarged plan view illustrating the negative electrode for the battery according to the embodiment of the present invention.

FIG. 5 is an enlarged plan view partially illustrating the negative electrode 3 of the present embodiment. The grooves 10 formed in the porous protective film 28 and the negative electrode active material layer 13 on one of the surfaces of the double-coated part 14, and the grooves 10 formed in the porous protective film 28 and the negative electrode active material layer 13 on the other surface of the double-coated part 14 are arranged at an inclination angle α of 45° relative to the longitudinal direction of the negative electrode 3 in different directions, so as to extend in directions crossing each other at right angles. On each of the surfaces of the double-coated part 14, the grooves 10 are arranged parallel to each other at the same pitch, and every groove 10 is formed to extend from one end to the other end of the porous protective film 28 and the negative electrode active material layer 13 in the lateral direction (a direction orthogonal to the longitudinal direction). As long as the grooves 10 are formed to open at one of the lateral ends of the porous protective film 28 and the negative electrode active material layer 13, the grooves 10 may not open at the other lateral ends. The inclination angle α is not limited to 45°, and it may be in the range of 30° to 90°. In this case, a phase of the grooves 10 formed in the one of the surfaces of the double-coated part 14 may be symmetric with a phase of the grooves 10 formed in the other surface of the double-coated part 14, in such a manner that the grooves 10 in each of the surfaces extend in the directions crossing each other.

Figure 6:
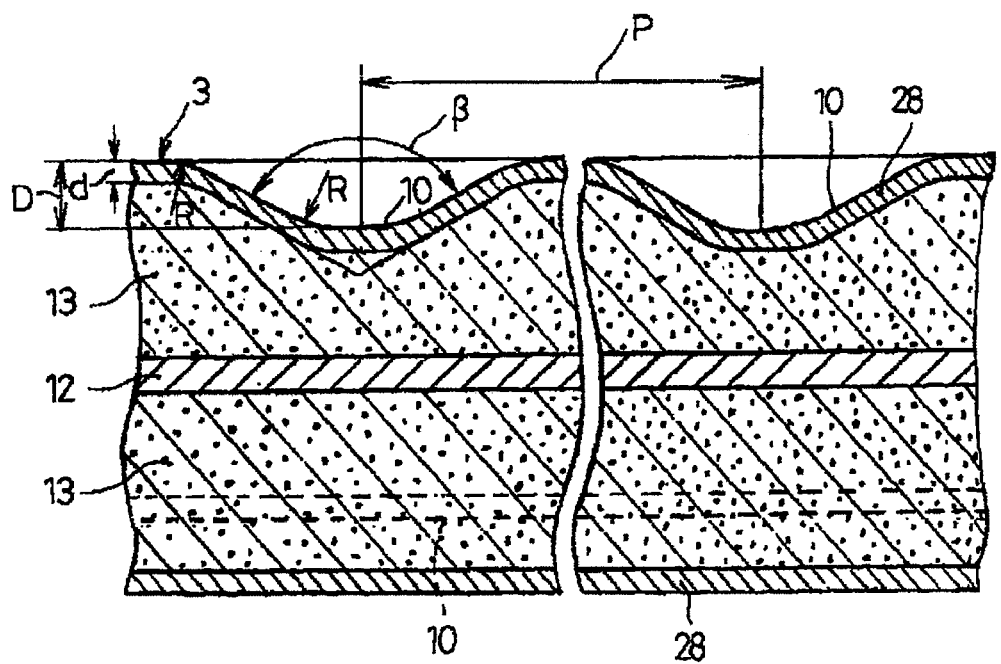
FIG. 6 is an enlarged cross-sectional view taken along the line A-A of FIG. 5.

The grooves 10 will be described in detail with reference to FIG. 6. FIG. 6 is an enlarged cross-sectional view taken along the line A-A in FIG. 5, illustrating the cross-sectional shape of the grooves 10, and an arrangement pattern of the grooves 10. The grooves 10 are formed at a pitch P of 170 μm in each of the surfaces of the double-coated part 14. Each of the grooves 10 has a substantially inversed trapezoidal cross section. In this embodiment, each of the grooves 10 has a depth D of 8 μm, and sidewalls thereof are inclined at an angle β of 120°. Corners formed by the bottom surface and the sidewalls of the groove 10 are arc-shaped to have a curvature R of 30 μm when viewed in cross section.

When the pitch P of the grooves 10 is small, a large number of grooves 10 can be formed to increase the total cross-sectional area of the grooves 10, thereby improving the penetration of the electrolyte. To examine this relationship, three types of negative electrodes 3 were formed, in which the depth D of the grooves 10 was fixed to 8 μm, while the pitch P was changed to 80 μm, 170 μm, and 260 μm. Then, three types of electrode groups 1 using the negative electrodes 3, respectively, were placed in the battery cases 7 to compare time required for the penetration of the electrolyte. As a result, the penetration time was about 20 minutes when the pitch P was 80 μm, about 23 minutes when the pitch P was 170 μm, and about 30 minutes when the pitch P was 260 μm. This indicates that the smaller pitch P of the grooves 10 allows faster penetration of the electrolyte into the electrode group 1.

When the pitch P of the grooves 10 is set smaller than 100 μm, the penetration of the electrolyte improves. However, the porous protective film 28 and the negative electrode active material layer 13 is compressed at many portions thereof due to the increased number of grooves 10, thereby increasing the filling density of the active material too much. Further, a planar area in the surface of the negative electrode active material layer 13 free from the grooves 10 is reduced too much, and a portion of the surface between two adjacent grooves 10 is protruded, which is easily crushed. When the protruded portion is crushed by chucking the electrode in a transfer process, the thickness of the negative electrode active material layer 13 may disadvantageously vary.

On the other hand, when the pitch P of the grooves 10 exceeds 200 μm, the current collector core 12 stretches, and the negative electrode active material layer 13 is greatly stressed. Further, peel resistance of the active material on the current collector core 12 decreases, and the active material may easily fall from the current collector core 12.

The decrease in peel resistance due to the increase in pitch P of the grooves 10 will be described in detail below.

When the negative electrode hoop material 11 passes between groove forming rollers 22, 23 which are the same rollers, groove forming protrusions 22a, 23a of the groove forming rollers 22, 23 bite into the porous protective film 28 and the negative electrode active material layers 13 on each surface of the double-coated part 14, thereby simultaneously forming the grooves 10 in the porous protective film 28 and the negative electrode active material layer 13 on each surface. In this case, loads of the groove forming protrusions 22a, 23a are simultaneously applied to, and are canceled at portions of the double-coated part 14 where the groove forming protrusions 22a, 23a overlap with each other with the double-coated part 14 interposed therebetween. That is, the loads are canceled only at the portions of the double-coated part 14 where the grooves 10 formed on the surfaces of the double-coated part 14 overlap with each other with the double-coated part 14 interposed therebetween. Except for these portions, the loads of the groove forming protrusions 22a, 23a are received only by the current collector core 12.

Thus, when the grooves 10 are formed in the surfaces of the double-coated part 14 at a large pitch P to extend in the directions crossing each other at right angles, portions to which the loads of the groove forming protrusions 22a, 23a are applied increase in length, thereby applying a large load to the current collector core 12. This stretches the current collector core 12, and the active material may flake from the porous protective film 28 and the negative electrode active material layer 13, or the active material may peel from the current collector core 12, thereby decreasing peel resistance of the porous protective film 28 and the negative electrode active material layer 13 on the current collector core 12.

In order to verify that the peel resistance decreases with the increase of the pitch P of the grooves 10, four types of negative electrodes 3 were formed, in which the depth D of the grooves 10 were fixed to 8 μm, and the pitch P of the grooves 10 was changed to 460 μm, 260 μm, 170 μm, and 80 μm. As a result of a peeling test of these negative electrodes 3, the peel resistance was about 4 N/m, about 4.5 N/m, about 5 N/m, and about 6 N/m in the descending order of the pitch P. This verifies that the peel resistance decreases with the increase of the pitch P of the grooves 10, and the active material easily falls.

After the grooves 10 are formed, cross-sections of the negative electrodes 3 were checked. In the negative electrode 3 provided with the grooves 10 at a large pitch P of 260 μm, the current collector core 12 was curved, and part of the active material was slightly peeled and separated from the current collector core 12.

Thus, the pitch P of the grooves 10 is preferably set in the range of 100 μm to 200 μm, both inclusive.

The grooves 10 formed in one of the surfaces of the double-coated part 14, and the grooves 10 formed in the other surface of the double-coated part 14 extend in the directions crossing each other. Therefore, when the groove forming protrusions 22a, 23a bite into the porous protective film 28 and the negative electrode active material layer 13 on the surfaces of the double-coated part 14, warp in the porous protective film 28 and the negative electrode active material layer 13 on one surface, and warp in the porous protective film 28 and the negative electrode active material layer 13 on the other surface are advantageously canceled each other. Further, when the grooves 10 are formed in the corresponding surfaces at the same pitch, a distance between portions of the double-coated part 14 where the grooves 10 overlap with each other is the minimum, thereby reducing the load applied to the current collector core 12. This increases peel resistance of the active material on the current collector core 12, thereby effectively preventing the active material from falling.

The grooves 10 formed in one of the surfaces of the double-coated part 14 are arranged in a pattern having a phase symmetric with a phase of a pattern of the grooves 10 formed in the other surface of the double-coated part 14. Accordingly, the porous protective film 28 and the negative electrode active material layer 13 formed on the one surface of the double-coated part 14, and the porous protective film 28 and the negative electrode active material layer 13 formed on the other surface of the double-coated part 14 stretch in the same manner when the grooves 10 are formed, and the porous protective film 28 and the negative electrode active material layer 13 would not be warped even after the formation of the grooves 10.

With the provision of the grooves 10 in each of the surfaces of the double-coated part 14, a larger amount of the electrolyte can uniformly be held as compared with the case where the grooves 10 are formed only in one of the surfaces of the double-coated part 14. This can ensure long cycle life.

The depth D of the grooves 10 will be described with reference to FIG. 6. The penetration or impregnation of the electrolyte into the electrode group 1 improves as the depth D of the grooves 10 increases. In order to verify this relationship, three types of negative electrodes 3 were formed, in which the grooves 10 were formed in the porous protective film 28 and the negative electrode active material layer 13 on each of the surfaces of the double-coated part 14 at a fixed pitch P of 170 μm, while the depth D was changed to 3 μm, 8 μm, and 25 μm. Then, three types of electrode groups 1 were formed by winding the negative electrode 3 and the positive electrode 2 with the separator 4 interposed therebetween. Each of the electrode groups 1 was placed in the battery case 7, and time required for the electrolyte to penetrate into the electrode group 1 was measured for comparison. As a result, the negative electrode 3 provided with the grooves 10 having a depth D of 3 μm required the penetration time of about 45 minutes, the negative electrode 3 provided with the grooves 10 having a depth D of 8 μm required the penetration time of about 23 minutes, and the negative electrode 3 provided with the grooves 10 having a depth D of 25 μm required the penetration time of about 15 minutes. This shows that the penetration of the electrolyte into the electrode group 1 improves as the depth D of the grooves 10 increases, and that the penetration of the electrolyte does not significantly improve when the depth D of the grooves 10 is smaller than 4 μm.

The penetration of the electrolyte improves as the depth D of the grooves 10 increases. However, the active material is severely compressed at portions where the grooves 10 are formed. Thus, lithium ions cannot move freely, and the lithium ions are less received. As a result, lithium metal may easily be deposited. Further, the negative electrode 3 is thickened as the depth D of the grooves 10 increases, and the stretch of the negative electrode 3 increases, thereby causing easy peeling of the porous protective film 28 and the negative electrode active material layer 13 from the current collector core 12. Further, the thickened negative electrode 3 may cause troubles in manufacture. For example, the porous protective film 28 and the negative electrode active material layer 13 may peel from the current collector core 12 in winding the electrodes to form the electrode group 1, or the electrode group 1 whose diameter is increased due to the increase in thickness of the negative electrode 3 may rub an end of an opening of the battery case 7 when the electrode group 1 is placed in the battery case 7, thereby making the placement of the electrode group 1 difficult. In addition, when the porous protective film 28 and the negative electrode active material layer 13 tend to easily peel from the current collector core 12, conductivity deteriorates, thereby affecting the battery characteristics.

The peel resistance of the porous protective film 28 and the negative electrode active material layer 13 on the current collector core 12 presumably decreases as the depth D of the grooves 10 increases. Specifically, the negative electrode active material layer 13 is thickened as the depth D of the grooves 10 increases. The increase in thickness results in decrease in peel resistance because a large force is applied in a direction of peeling the active material from the current collector core 12.

In order to verify this relationship, four types of negative electrodes 3 were formed, in which the pitch P of the grooves 10 was fixed to 170 μm, and the depth D of the grooves 10 was changed to 25 μm, 12 μm, 8 μm, and 3 μm. As a result of a peeling test of these negative electrodes 3, the peel resistance was about 4 N/m, about 5 N/m, about 6 N/m, and about 7 N/m in the descending order of the depth D. This verifies that the peel resistance decreases as the depth D of the grooves 10 increases.

From the foregoing, the followings have been found with respect to the depth D of the grooves 10. Specifically, when the depth D of the grooves 10 is set smaller than 4 μm, the penetration or impregnation of the electrolyte is insufficient.

On the other hand, when the depth D of the grooves 10 exceeds 20 μm, the peel resistance of the active material on the current collector core 12 decreases. As a result, the battery capacity may decrease, or the fallen active material may penetrate the separator 4 to contact with the positive electrode 2, thereby causing an internal short circuit. Thus, when the depth D of the grooves 10 is reduced as much as possible, and the number of the grooves 10 is increased, the disadvantageous phenomena can be prevented from occurring, and good penetration of the electrolyte can be obtained. For these purposes, the depth D of the grooves 10 should be set in the range of 4 μm to 20 μm, both inclusive, preferably 5 to 15 μm, more preferably 6 to 10 μm.

In order to verify the preferred ranges, three types of negative electrodes 3 were formed, i.e., a first negative electrode 3 including the grooves 10 having the depth D of 8 μm formed in each of the surfaces of the double-coated part 14 at the pitch P of 170 μm, a second negative electrode 3 including the grooves of the same depth D arranged at the same pitch P in only one of the surfaces of the double-coated part 14, and a third negative electrode 3 including no grooves 10 in the surfaces thereof. A plurality sets of batteries were produced by placing three types of electrode groups 1 constituted of these negative electrodes 3 in the battery cases 7. A predetermined amount of the electrolyte was injected in each of the battery cases, and the battery cases were evacuated to impregnate the electrode group with the electrolyte. Then, the batteries were disassembled to check the degree of impregnation of the negative electrode 3 with the electrolyte.

Immediately after the injection of the electrolyte, the negative electrode 3 including no grooves 10 in the surfaces thereof was impregnated with the electrolyte only by 60% of an area thereof. In the negative electrode 3 including the grooves 10 in only one of the surfaces thereof, 100% of an area of the surface provided with the grooves 10 was impregnated with the electrolyte, while about 80% of an area of the surface provided with no grooves 10 was impregnated with the electrolyte. Contrary to this, in the negative electrode 3 provided with the grooves 10 in each of the surfaces thereof, 100% of an area of each of the surfaces was impregnated with the electrolyte.

To check time required for impregnating the whole part of the negative electrode 3 with the electrolyte after the injection, the batteries were disassembled and checked every hour. As a result, in the negative electrode 3 provided with the grooves 10 in each of the surfaces thereof, 100% of each of the surfaces was impregnated with the electrolyte immediately after the injection. In the negative electrode 3 provided with the grooves 10 in only one of the surfaces thereof, 100% of the surface provided with no grooves 10 was impregnated with the electrolyte after a lapse of two hours. In the negative electrode 3 provided with no grooves 10 in the surfaces thereof, 100% of each of the surfaces was impregnated with the electrolyte after a lapse of five hours. However, in a portion of the negative electrode 3 impregnated immediately after the injection, the amount of the electrolyte was small, thereby varying the distribution of the electrolyte. The results indicate that the negative electrode 3 with the grooves 10 formed in each of the surfaces thereof can be impregnated with the electrolyte in about half the time required to completely impregnate the negative electrode 3 including the grooves 10 of the same depth D formed in only one of the surfaces thereof, and can increase the cycle life of the battery.

During the cycle test, the batteries were disassembled to examine the distribution of the electrolyte in the negative electrode 3 provided with the grooves 10 in only one of the surfaces thereof for the purpose of examining the cycle life by checking the amount of EC (ethylene carbonate), which is a main ingredient of the nonaqueous electrolyte, extracted per unit area of the electrode. As a result, irrespective of a portion of the electrode where the extraction was performed, the surface provided with the grooves 10 contained EC in an amount larger by about 0.1 to 0.15 mg than the surface which was not provided with the grooves 10. Specifically, when the grooves 10 are formed in each of the surfaces, the EC amount in the surfaces of the electrode was the largest, and the surfaces were uniformly impregnated with the electrolyte without uneven distribution of the electrolyte. In the surface provided with no grooves 10, however, the amount of the electrolyte was small, thereby increasing internal resistance, and reducing the cycle life.

The grooves 10 are formed to extend from one lateral end to the other lateral end of the porous protective film 28 and the negative electrode active material layer 13. This can significantly improve the penetration of the electrolyte into the electrode group 1, thereby greatly reducing the penetration time. In addition, since the impregnation of the electrode group 1 with the electrolyte is significantly improved, depletion of the electrolyte for charge/discharge of the battery can effectively be prevented, and uneven distribution of the electrolyte in the electrode group 1 can be prevented. Further, with the grooves 10 inclined relative to the longitudinal direction of the negative electrode 3, the impregnation of the electrode group 1 with the electrolyte improves, and stress caused on the electrodes in the winding step for forming the electrode group 1 can be prevented, thereby effectively preventing break of the negative electrode 3.

The positive electrode 2 will be described. Referring to FIG. 3, in a positive electrode hoop material (not shown) formed in the same process for forming the negative electrode hoop material, a current collector lead 70 is welded to a current collector core 72 of a core exposed part 78, and the current collector lead 70 is covered with an insulation tape 71. Then, the positive electrode hoop material is cut by a cutter to provide a double-coated part 74 of a predetermined length, thereby dividing the positive electrode hoop material into electrode component parts 79.

The negative electrode 3 and the positive electrode 2 are wound into spiral form in the direction of an arrow Y with the separator 4 interposed therebetween, thereby constituting the electrode group 1 of the present embodiment.

The positive electrode 2 configured in the above-described manner offers the following advantages.

Specifically, the core exposed part 78 of the positive electrode 2 is located at the longitudinal center of the positive electrode 2. Thus, as compared with a positive electrode in which the core exposed part is located at a longitudinal end of the positive electrode, a distance from the positive electrode current collector lead 70 attached to the core exposed part 78 to each longitudinal end of the positive electrode 2 can be reduced. This allows effective current collection. As a result, current collection can be improved.

A process of forming the grooves 10 in the surfaces of the double-coated part 14 of the negative electrode 3 will be described with reference to FIG. 7.

Figure 7:
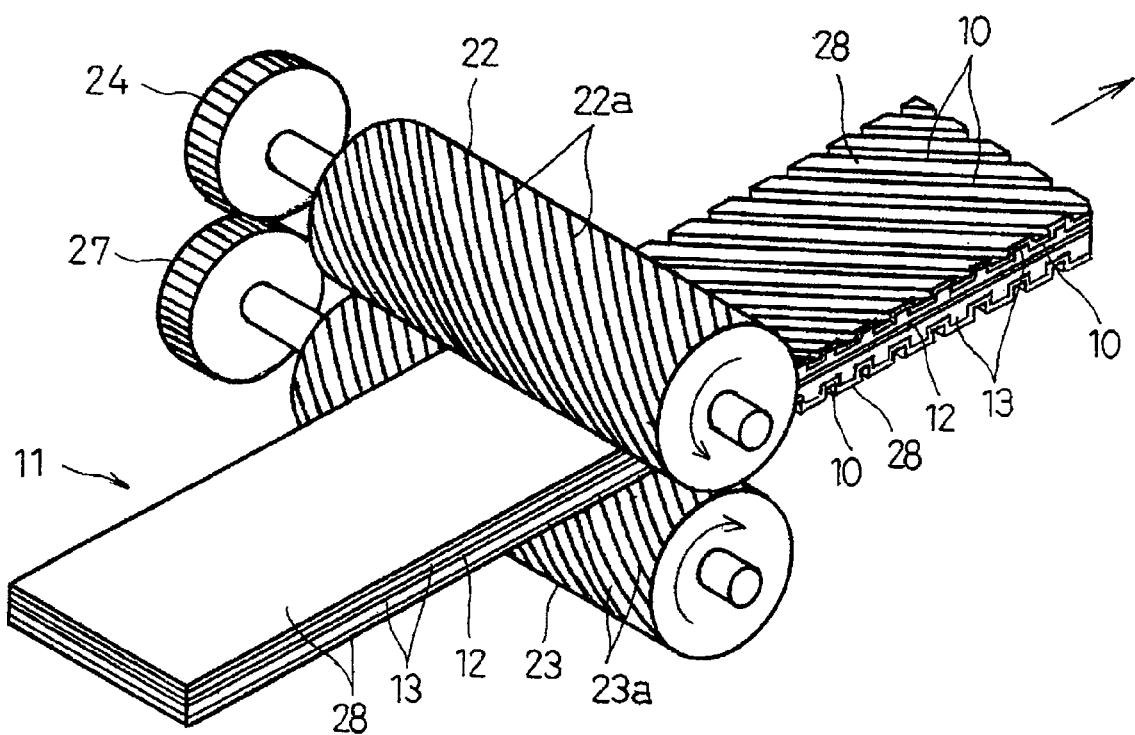
FIG. 7 is a perspective view illustrating a process for forming grooves in each surface of a double-coated part according to the embodiment of the present invention.
Figure 8:
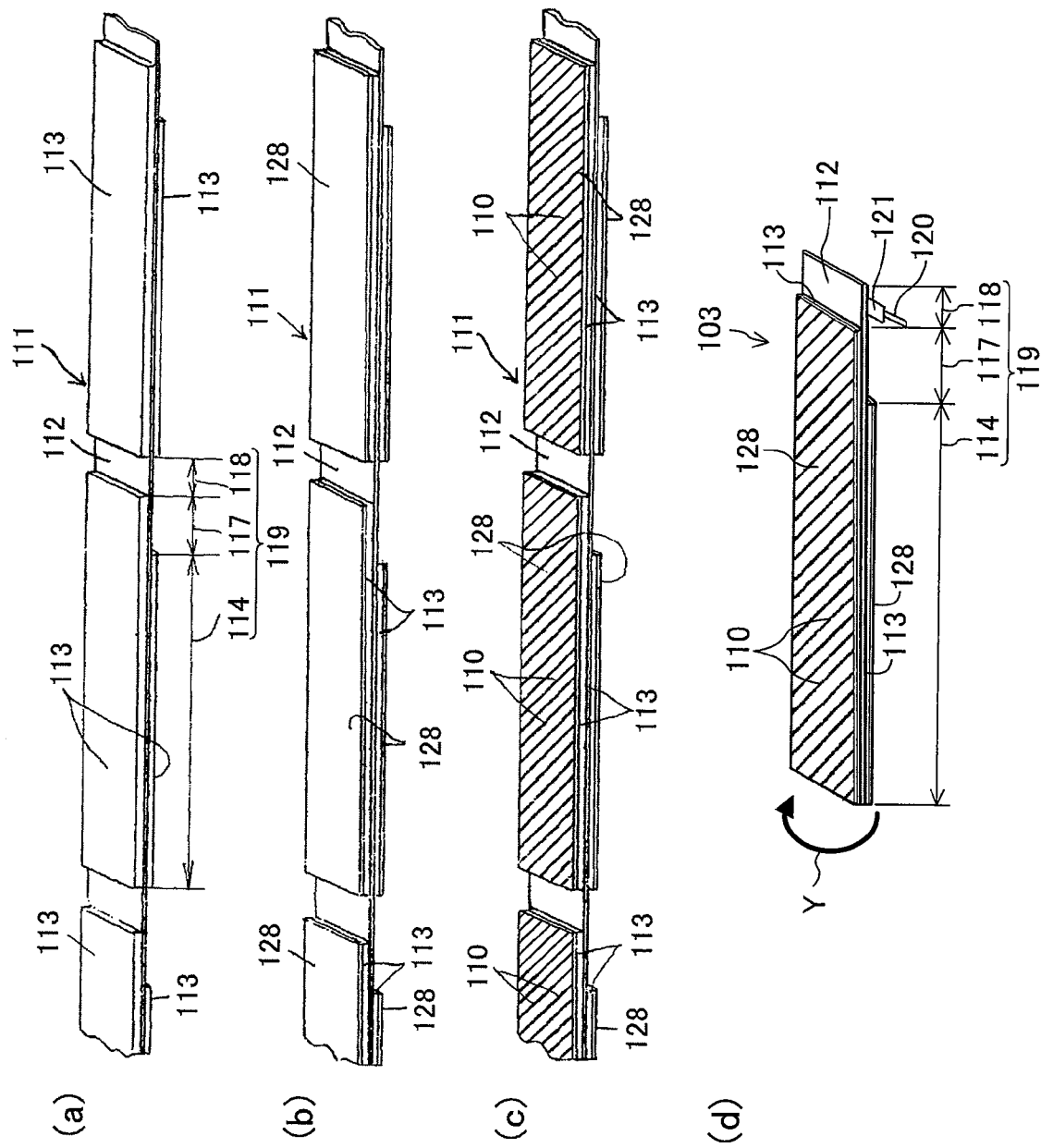
FIG. 8(a) is a perspective view illustrating a negative electrode active material applied to a current collector core in the step of producing a conventional negative electrode for a battery.
FIG. 8(b) is a perspective view illustrating a porous protective film formed on a surface of a negative electrode active material layer in the step.
FIG. 8(c) is a perspective view illustrating a double-coated part including grooves formed in the step.
FIG. 8(d) is a perspective view illustrating a negative electrode separated from a negative electrode hoop in the step.

As shown in FIG. 7, a pair of groove forming rollers 22, 23 are arranged to have a predetermined gap therebetween, and the negative electrode hoop material 11 shown in FIG. 2(a) is allowed to pass through the gap between the groove forming rollers 22, 23. In this manner, the grooves 10 of a predetermined shape are formed in the porous protective film 28 and the negative electrode active material layer 13 on each of the surfaces of the double-coated part 14 of the negative electrode hoop material 11.

The groove forming rollers 22, 23 are the same rollers, and each of which includes a plurality of groove forming protrusions 22a, 23a extending at a helix angle of 45 with respect to an axial center thereof. Each of the groove forming protrusions 22a, 23a is easily and precisely formed by coating the entire surface of an iron roller body with chromium oxide by thermal spraying to form a ceramic layer, and partially melting the ceramic layer by laser application to form a predetermined pattern. The groove forming rollers 22, 23 are almost the same rollers as a laser-engraved ceramic roller generally used in the field of printing. The groove forming rollers 22, 23 made of chromium oxide have hardness of HV1150 or higher, i.e., they are considerably hard. Therefore, the rollers are resistant to sliding movement and wear, and are capable of ensuring life ten or more times longer than that of iron rollers.

Thus, when the negative electrode hoop material 11 passes through the gap between the groove forming rollers 22, 23, each of which is provided with a number of groove forming protrusions 22a, 23a, the grooves 10 extending in the directions crossing each other at right angles can be formed in the negative electrode active material layer 13 on each of the surfaces of the double-coated part 14 of the negative electrode hoop material 11 as shown in FIG. 5.

Each of the groove forming protrusions 22a, 23a has a cross-sectional shape which allows formation of the grooves 10 having the cross-sectional shape shown in FIG. 6, i.e., an arc-shaped cross-sectional shape in which a tip end has an angle $\beta$ of 120°, and a curvature R of 30 µm. The angle $\beta$ at the tip end is set to 120° because the ceramic layer is easily broken when the angle is smaller than 120°. The curvature R at the tip end of the groove forming protrusions 22a, 23a is set to 30 µm to prevent the occurrence of crack in the porous protective film 28 and the negative electrode active material layers 13 when the grooves 10 are formed by pressing the groove forming protrusions 22a, 23a onto the negative electrode active material layers 13. The height of the groove forming protrusions 22a, 23a is set to about 20 to 30 µm because the most preferable depth D of the grooves 10 is in the range of 6 to 10 µm. If the groove forming protrusions 22a, 23a are too short, the flat surface of the groove forming roller 22, 23 around the groove forming protrusions 22a, 23a comes into contact with the negative electrode active material layer 13, and the active material separated from the negative electrode active material layer 13 is adhered to the surface around the groove forming rollers 22, 23. For this reason, the height of the protrusions has to be larger than the depth D of the grooves 10 to be formed.

For rotating the groove forming rollers 22, 23, rotary force applied by a servomotor etc. is transferred to the groove forming roller 23, and the rotation of the groove forming roller 23 is transferred to the groove forming roller 22 through a pair of gears 24, 27 which are attached to roller shafts of the groove forming rollers 22, 23, respectively, and engage with each other. Thus, the groove forming rollers 22, 23 rotate at the same rotational speed.

As a process for forming the grooves 10 by biting the groove forming protrusions 22a, 23a of the groove forming roller 22, 23 into the porous protective film 28 and the negative electrode active material layer 13, there are two types of processes. One is a constant dimension process of setting the depth D of the grooves 10 by controlling the gap between the groove forming rollers 22, 23. The other is a constant pressure process in which the groove forming roller 23 to which the rotary force is transferred is fixed, and pressure applied to the groove forming roller 22 capable of moving up and down is adjusted in view of correlation between pressure applied to the groove forming protrusions 22a, 23a and the depth D of the grooves 10, thereby setting the depth D of the grooves 10. In the present invention, the grooves 10 are preferably formed by the constant pressure process.

A reason why the constant pressure process is preferable is as follows. In the constant dimension process, it is difficult to precisely set the gap between the groove forming rollers 22, 23 for setting the depth D of the grooves 10 in the order of µm. In addition, deflections of the roller shafts of the groove forming rollers 22, 23 directly affect the depth D of the grooves 10. In the constant pressure process, pressure for pressing the groove forming roller 22 (e.g., air pressure of an air cylinder) can automatically be adjusted to be constant even if the thickness of the double-coated part 14 varies, although it is slightly affected by the filling density of the active material in the negative electrode active material layer 13. Thus, the grooves 10 of the predetermined depth D can be formed with high productivity.

In forming the grooves 10 by the constant pressure process, the negative electrode hoop material 11 has to pass through the gap between the groove forming rollers 22, 23 without forming the grooves 10 in the negative electrode active material layer 13 of the single-coated part 17 of the negative electrode hoop material 11. In this case, a stopper can be provided between the groove forming rollers 22, 23 to keep the groove forming roller 22 in a non-pressing state with respect to the single-coated part 17. The "non-pressing state" indicates a state where the groove forming roller 22 abuts the single-coated part 17, but does not form the grooves 10 (a non-contact state is also included).

When the negative electrode 3 is thin, the double-coated part 14 is as thin as about 200 µm. In order to form the grooves 10 having a depth D of 8 µm in the thin double-coated part 14, the grooves 10 have to be formed with higher precision. For this purpose, each of the roller shafts of the groove forming rollers 22, 23 is fitted in bearings without leaving a gap therebetween, except for a gap which allows the bearings to rotate, and the bearings and bearing holders for holding the bearings are also fitted with each other without leaving a gap therebetween. Thus, the negative electrode hoop material 11 is allowed to pass through the gap between the groove forming rollers 22, 23 without wobbling. In this way, the negative electrode hoop material 11 is allowed to smoothly pass through the gap between the groove forming rollers 22, 23 in such a manner that the grooves 10 are precisely formed in the porous protective film 28 and the negative electrode active material layer 13 on each of the surfaces of the double-coated part 14, while the grooves 10 are not formed in the surface of the single-coated part 17.

The present invention has been described by way of the preferred embodiment. However, the embodiment described above is not intended to limit the invention, and can be modified in various ways. For example, the electrode group 1 of the present embodiment is constituted of the positive and negative electrodes 2 and 3 wound with the separator 4 interposed therebetween. However, the similar advantages can be obtained using an electrode group 1 constituted of the positive and negative electrodes 2 and 3 accordion-folded with the separator 4 interposed therebetween.

The electrode group for the battery according to the embodiment of the invention, and a method and an apparatus for producing a cylindrical nonaqueous secondary battery using the electrode group will be described in detail with reference to the drawings.

The invention is not limited to the example.

EXAMPLE 1

A negative electrode mixture paste was prepared by mixing, in a kneader, 100 parts by weight of artificial graphite as a negative electrode active material, 2.5 parts by weight of styrene-butadiene copolymer rubber particle dispersion (40 wt % of solid content) as a binder relative to 100 parts by weight of the active material (1 part by weight on a basis of solid content of the binder), 1 part by weight of carboxymethyl cellulose as a thickener relative to 100 parts by weight of the active material, and a proper amount of water. The negative electrode mixture paste was applied to a current collector core 12 made of 10 μm thick copper foil, and the paste was dried and pressed by rolling to a total thickness of about 200 μm to obtain a negative electrode active material layer. Then, a mixture prepared by kneading a small amount of a binder with alumina having a particle diameter of about 1.2 μm was applied to the surface of the negative electrode active material layer 13 using a roller device for intermittent application to a thickness of about 5 μm, and the mixture was dried to form a porous protective film 28. Then, the obtained product was cut by a slitter into strips of about 60 mm in width, which is the width of a negative electrode 3 of a cylindrical lithium secondary battery having a nominal capacity of 2550 mAh, a diameter of 18 mm, and a height of 65 mm. Thus, a negative electrode hoop material 11 was formed.

Then, as groove forming rollers 22, 23, rollers of 100 mm in outer diameter were used, each of which was provided with groove forming protrusions 22a, 23a on a ceramic outer circumferential surface thereof. The groove forming protrusions 22a, 23a had an angle of 120° at a tip end thereof, and a height H of 25 μm, and were arranged at a pitch of 170 μm, while forming a helix angle of 45° with the circumferential direction of the roller. The negative electrode hoop material 11 was allowed to pass between the groove forming rollers 22, 23, thereby forming grooves 10 in each of the surfaces of the double-coated part 14 of the negative electrode hoop material 11. Gears 24, 27 fixed to roller shafts of the groove forming rollers 22, 23 were allowed to engage with each other to drive the groove forming roller 22 to rotate by a servomotor, thereby rotating the groove forming rollers 22, 23 at the same rotational speed.

The groove forming roller 22 was pressed by an air cylinder. The depth D of the grooves 10 were adjusted by adjusting air pressure of the air cylinder. In this case, stoppers prevented the groove forming roller 22 from approaching the groove forming roller 23, and reducing a gap of 100 μm therebetween, which was set as a minimum gap between the groove forming rollers 22, 23, thereby preventing the formation of the grooves 10 in the single-coated part 17. The stoppers were adjusted to keep the gap of 100 μm between the groove forming rollers 22, 23.

For setting the depth D of the grooves 10 to 8 μm, air pressure of the air cylinder for applying pressure to the groove forming roller 22 was adjusted to impose a load of 30 kgf per 1 cm of the width of the negative electrode hoop material 11. The negative electrode hoop material 11 was transferred through the gap between the groove forming rollers 22, 23 at a speed of 5 m/min. With this configuration, the grooves 10 were formed in each of the surfaces of the double-coated part 14 of the negative electrode hoop material 11. A depth D of the grooves 10 in the porous protective film 28 and the negative electrode active material layer 13 was measured by a profile measuring instrument. An average depth was 8.5 μm, and the grooves 10 were not formed in the porous protective film 28 and the negative electrode active material layer 13 of the single-coated part 17. Whether crack was formed in the porous protective film 28 and the negative electrode active material layer 13 or not was checked by a laser microscope, but the crack was not found at all. The negative electrode 3 increased in thickness by about 0.5 μm, and stretched in the longitudinal direction by about 0.1% per cell.

As a positive electrode active material, lithium nickel composite oxide represented by the composition formula of $LiNi_{0.8}Co_{0.15}Al_{0.05}O_2$ was used. To a $NiSO_4$ aqueous solution, cobalt sulfate and aluminum sulfate of the predetermined ratio were added to prepare a saturated aqueous solution. While stirring the saturated aqueous solution, an alkaline solution dissolving sodium hydroxide was slowly dropped therein for neutralization, thereby precipitating ternary system nickel hydroxide $Ni_{0.8}Co_{0.15}Al_{0.05}(OH)_2$. The precipitate was filtered, washed with water, and dried at 80° C. Nickel hydroxide obtained in this manner had an average particle diameter of about 10 μm.

Lithium hydroxide hydrate was added in such a manner the ratio between the sum of numbers of atoms of Ni, Co, and Al and the number of atoms of Li was 1:1.03, and the obtained product was thermally treated in an oxygen atmosphere for 10 hours at 800 C to obtain $LiNi_{0.8}Co_{0.15}Al_{0.05}O_2$. As a result of powder X-ray diffractometry, the obtained lithium nickel composite oxide had a single phase, hexagonal crystalline structure, in which Co and Al were in the state of solid solution. The obtained product was pulverized, and classified to obtain positive electrode active material powder.

To 100 parts by mass of the active material, 5 parts by mass of acetylene black was added as a conductive agent, and a solution prepared by dissolving PVdF (polyvinylidene fluoride) as a binder in a NMP (N-methyl pyrrolidone) solvent was kneaded with the mixture to prepare paste. The amount of PVdF added was adjusted to 5 parts by mass relative to 100 parts by mass of the active material. The paste was applied to each surface of a current collector core made of 15 μm thick aluminum foil, and the paste was dried and rolled to obtain a positive electrode hoop material having a thickness of about 200 μm, and a width of about 60 mm.

After the negative and positive electrode hoop materials were dried to remove extra moisture, the electrode hoop materials were wound with a separator 4 made of an about 30 μm thick microporous polyethylene film interposed therebetween in a dry air room to form an electrode group 1. The negative electrode hoop material 11 is cut at the core exposed part 18 located between the double-coated part 14 and the single-coated part 17. Since the groove forming rollers 22, 23 are configured not to form the grooves 10 in the porous protective film 28 and the negative electrode active material layer 13 of the single-coated part 17, the core exposed part 18 and the single-coated part 17 were not deformed after the cutting, and operation of a winding machine was not affected. A current collector lead 20 was attached to the negative electrode hoop material 11 before the winding using a welder attached to the winding machine.

As a comparative example, the groove forming roller 23 was replaced with a flat roller not including the groove forming protrusions. Then, the gap between the groove forming rollers 22, 23 was set to 100 μm, a load applied to the negative electrode 3 per 1 cm of the width was adjusted to 31 kg, and the grooves 10 having a depth D of about 8 μm were formed in the porous protective film 28 and the negative electrode active material layer 13 on only one of the surfaces of the double-coated part 14 to form a negative electrode (Comparative Example 1). Another negative electrode (Comparative Example 2) was formed without forming the grooves 10 in the porous protective film 28 and the negative electrode active material layer 13 on each surface of the double-coated part 14.

Each of the electrode group 1 prepared in this manner were placed in a battery case 7, and an electrolyte was injected in the battery case to examine penetration of the electrolyte.

For evaluation of the penetration of the electrolyte, about 5 g of the electrolyte was fed into the battery case 7, and the battery case 7 was evacuated to allow impregnation with the electrolyte. The electrolyte may be fed into the battery case 7 in several times.

After the predetermined amount of the electrolyte was injected, the battery case 7 was placed in a vacuum booth for evacuation, thereby discharging air in the electrode group. Then, atmospheric air was introduced in the vacuum booth to forcibly allow the electrolyte to penetrate into the electrode group due to differential pressure between the pressure in the battery case 7 and the pressure of the atmospheric air. The evacuation was performed by vacuum suction to a degree of vacuum of −85 kpa. Time required for the penetration was measured as data for comparison of the penetration.

Figure 9:
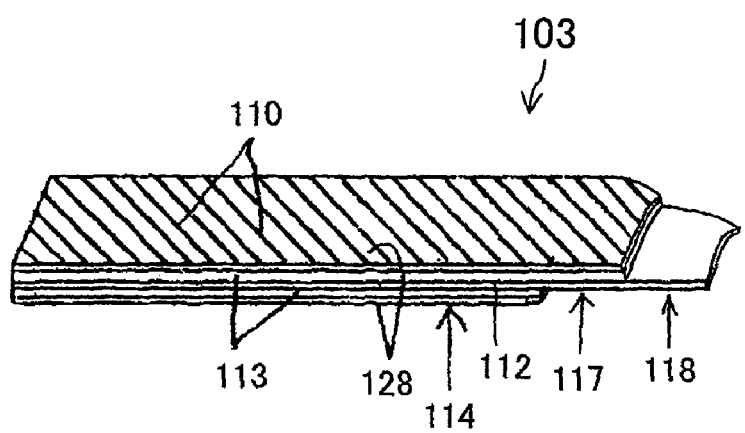
FIG. 9 is a perspective view illustrating problems of the conventional negative electrode for the battery.

In an actual battery production process, the electrolyte is simultaneously fed to a plurality of battery cases 7, and the battery cases 7 are simultaneously deaerated by evacuation to a degree of vacuum of −85 kpa, and then the atmospheric air is introduced to forcibly allow the electrolyte to penetrate into the electrode group. Thus, the penetration of the electrolyte is finished. A determination of completion of the penetration is made when the electrolyte is no longer found when the inside of the battery case 7 is visually checked from immediately above the battery case. To obtain average penetration time which could be used for actual production, the electrolyte is simultaneously allowed to penetrate into multiple cells. Table 1 shows the results.

tive film 28 and the negative electrode active material layer 13 on one of the surfaces of the double-coated part 14, and in the porous protective film 28 and the negative electrode active material layer 13 of the single-coated part 17, the electrodes were misaligned in the winding, and the negative electrode active material fell from the negative electrode active material layer 13 of the single-coated part 17. Therefore, the check of the penetration was stopped. As a possible cause of these disadvantages, when the negative electrode hoop material 11 was cut at the core exposed part 18 adjacent to the double-coated part 14, the single-coated part 17 was warped as shown in FIG. 9 due to distribution of internal stress generated by forming the grooves 10 in the single-coated part 17. The deformation of the electrode caused misalignment in winding the electrodes, and failure in reliably holding the electrode by a chuck etc. As a result, the negative electrode active material fell. With use of the negative electrode (Comparative Example 1) that caused the winding misalignment and the falling of the active material, the penetration time was 30 minutes.

For producing test batteries, the predetermined amount of the electrolyte was injected, evacuation was performed, and the atmospheric air was introduced for the penetration of the electrolyte into the electrode group. The battery of Example showed reduction of the penetration time. Therefore, the electrolyte was less evaporated during the penetration, thereby improving the penetration, and significantly reducing the penetration time. As a result, the opening of the battery case can hermetically be sealed while reducing the amount of the electrolyte evaporated as much as possible. This indicates that

TABLE 1

|  | In electrode | In electrode group | Penetration time |
| --- | --- | --- | --- |
| Example 1 | Grooves are formed in each of the surfaces of the double-coated part, but not formed in the single-coated part | Grooves are formed in inner and outer circumferential surfaces | 22 min. + 17 sec. |
| Comparative Example 1 | Grooves are formed in one of the surfaces of the double-coated part, and in the single-coated part | Grooves are formed in an inner circumferential surface | — |
| Comparative Example 2 | Grooves are not formed | Grooves are not formed | 69 min. + 13 sec. |

As apparent from the results shown in Table 1, in the electrode group 1 including the negative electrode 3 in which the grooves 10 having a depth of about 8 µm were formed in the surface of the porous protective film 28 to extend in the surface of the negative electrode active material layer 13, the penetration time was 22 minutes and 17 seconds. In the electrode group 1 including the negative electrode 3 in which only the porous protective film 28 was formed, and the grooves 10 were not formed, the penetration time was 69 minutes and 13 seconds. The results indicate that the negative electrode (Example 1) in which the grooves 10 were formed in the porous protective film 28 and the negative electrode active material layer 13 on each surface of the double-coated part 14 significantly improved the penetration of the electrolyte as compared with the negative electrode (Comparative Example 2) in which the grooves 10 were not formed in the porous protective film 28 and the negative electrode active material layer 13 on each surface.

With use of the negative electrode (Comparative Example 1) in which the grooves 10 were formed in the porous protecthe improvement in penetration or impregnation of the electrolyte was able to greatly reduce the loss of the electrolyte.

An electrode group 1 including the negative electrode 3 in which the grooves 10 were formed in the surface of the porous protective film 28 was placed in the battery case 7. Then, about 5 g of an electrolyte prepared by dissolving 1 M LiPF$_6$, and 3 parts by weight of VC (vinylene carbonate) in a solution mixture of EC (ethylene carbonate), DMC (dimethyl carbonate), and MEC (methyl ethyl carbonate) was introduced in the battery case 7, and the battery case 7 was sealed, thereby producing a cylindrical lithium battery having a nominal capacity of 2550 mAh, a nominal voltage of 3.7 V, a diameter of 18 mm, and a height of 65 mm.

As a result of a crush test, a nail penetration test, and an external short circuit test performed on the produced battery, the battery did not cause heat generation, and expansion. In an overcharge test, the battery did not cause leakage of the electrolyte, heat generation, and gas generation. Further, in a thermal test at 150 C, the battery did not cause expansion, heat generation, and gas generation. The results indicate that the porous protective film 28 made of alumina effectively functioned to prevent thermal runaway, although the grooves 10 are formed in the porous protective film 28.

INDUSTRIAL APPLICABILITY

An electrode group for a battery of the present invention allows good impregnation with an electrolyte, reduces an internal short circuit, and has high productivity and reliability. A cylindrical nonaqueous secondary battery including the electrode group is useful for, e.g., driving power supplies for mobile electronic devices and communication devices.

DESCRIPTION OF REFERENCE CHARACTERS

1 Electrode group
2 Positive electrode
3 Negative electrode
4 Separator
7 Battery case
8 Gasket
9 Sealing plate
10 Groove
11 Negative electrode hoop material
12 Current collector core
13 Negative electrode active material layer
14 Double-coated part
17 Single-coated part
18 Core exposed part
19 Electrode component part
20 Current collector lead
21 Insulation tape
22, 23 Groove forming roller
22a, 23a Groove forming protrusion
24, 27 Gear
28 Porous protective film
70 Current collector lead
71 Insulation tape
72 Current collector core
73 Positive electrode active material layer
74 Double-coated part
78 Core exposed part
79 Electrode component part

The invention claimed is:

1. An electrode group for a nonaqueous battery comprising:
a positive electrode and a negative electrode wound with a separator interposed therebetween, wherein
the positive electrode includes
a double-coated part which includes a positive electrode active material layer formed on each surface of a positive electrode current collector core; and
a core exposed part which is located at a longitudinal center of the positive electrode current collector core, and does not include the positive electrode active material layer,
a positive electrode current collector lead is connected to the core exposed part of the positive electrode,
the negative electrode includes
a double-coated part which includes a negative electrode active material layer and a porous protective film formed on each surface of a negative electrode current collector core;
a core exposed part which is located at an end of the negative electrode current collector core, and does not include the negative electrode active material layer and a porous protective film; and
a single-coated part which is located between the double-coated part and the core exposed part, and includes the negative electrode active material layer and a porous protective film formed only on one of the surfaces of the negative electrode current collector core,
a plurality of grooves are formed in each surface of the double-coated part of the negative electrode, while the grooves are not formed in the single-coated part of the negative electrode,
the grooves are formed in a surface of the porous protective film to extend in a surface of the active material layer, and a thickness of the porous protective film is smaller than a depth of the grooves,
a negative electrode current collector lead is connected to the core exposed part of the negative electrode, and
the negative electrode is wound in such a manner that the core exposed part of the negative electrode constitutes a last wound end.

2. The electrode group for the nonaqueous battery of claim 1, wherein
the porous protective film is made of a material containing inorganic oxide as a main ingredient.

3. The electrode group for the nonaqueous battery of claim 2, wherein
the inorganic oxide which is the main ingredient of the porous protective film contains alumina and/or silica as a main ingredient.

4. The electrode group for the nonaqueous battery of claim 1, wherein
a phase of the grooves formed in one of the surfaces of the double-coated part of the negative electrode is symmetric with a phase of the grooves formed in the other surface of the double-coated part of the negative electrode.

5. The electrode group for the nonaqueous battery of claim 1, wherein
a depth of the grooves formed in each of the surfaces of the double-coated part of the negative electrode is in the range of 4 μm to 20 μm.

6. The electrode group for the nonaqueous battery of claim 1, wherein
the grooves formed in each of the surfaces of the double-coated part of the negative electrode are arranged at a pitch of 100 μm to 200 μm in the longitudinal direction of the negative electrode.

7. The electrode group for the nonaqueous battery of claim 1, wherein
the grooves formed in each of the surfaces of the double-coated part of the negative electrode extend from one lateral end to the other lateral end of the negative electrode.

8. The electrode group for the nonaqueous battery of claim 1, wherein
the grooves formed in one of the surfaces of the double-coated part of the negative electrode, and the grooves formed in the other surface of the double-coated part of the negative electrode are inclined at an angle of 45 relative to the longitudinal direction of the negative electrode in different directions, so as to extend in directions crossing each other at right angles.

9. The electrode group for the nonaqueous battery of claim 1, wherein
the negative electrode current collector lead, and the negative electrode active material layer and the porous protective film of the single-coated part of the negative electrode are arranged on the opposite surfaces of the current collector core.

10. A method for producing the electrode group for a nonaqueous battery of claim 1, the method comprising:
    winding the positive electrode and the negative electrode with the separator interposed therebetween, wherein the positive electrode and the negative electrode are wound in such a manner that the core exposed part of the negative electrode constitutes a last wound end.

11. A cylindrical nonaqueous secondary battery, wherein the electrode group of claim 1 is contained in a battery case, a predetermined amount of a nonaqueous electrolyte is injected in the battery case, and an opening of the battery case is hermetically sealed.

12. A method for producing the cylindrical nonaqueous secondary battery of claim 11, the method comprising:
    forming the electrode group by the method of claim 9; and
    introducing the electrode group and the nonaqueous electrolyte in the battery case, and sealing the battery case.

* * * * *